United States Patent Office 3,527,785
Patented Sept. 8, 1970

3,527,785
4-ACETOXY-BENZYLIDENEMALONITRILES
Toshiaki Ozaki, Toyonaka-shi, Keimei Fujimoto, Kyoto, Sigeo Yamamoto, Toyonaka-shi, Yositosi Okuno, Nishinomiya-shi, Toshiyuki Wakatsuki, Kyoto, Taizo Ogawa, Minoo-shi, Fukashi Horiuchi and Akira Fujinami, Takarazuka-shi, and Yoshihiko Nishizawa, Nara-shi, Japan, assignors to Sumitomo Chemical Company, Ltd., Osaka, Japan, a corporation of Japan
No Drawing. Filed Dec. 5, 1967, Ser. No. 688,004
Claims priority, application Japan, Dec. 6, 1966, 41/80,237, 41/80,238
Int. Cl. A01n 9/02, 9/20; C07c 121/70
U.S. Cl. 260—465                                      5 Claims

ABSTRACT OF THE DISCLOSURE

4 - acetoxy - benzylidenemalonitriles in which the benzene nuclei have further been substituted by lower alkyl groups are prepared by acetylating 4-hydroxy-benzylidenemalonitriles. They have fungicidal, insecticidal, acaricidal and nematocidal activities and are used as agricultural pesticides.

---

This invention relates to novel benzylidenemalonitriles. More particularly, the invention pertains to novel 4-acetoxy - alkyl - benzylidenemalonitriles having activities to control injurious diseases and insects, and represented by the formula,

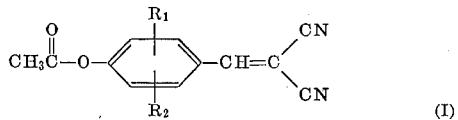

(I)

wherein $R_1$ and $R_2$ are lower alkyl groups, but either one of $R_1$ and $R_2$ may be a hydrogen atom, to a process for producing the same, and to pesticidal compositions containing the same. The present compounds represented by the Formula I are used as active ingredients of agricultural chemicals useful as fungicides, insecticides, acaricides and nematocides.

It is therefore the object of the present invention to provide novel compounds having activities to control injurious diseases and insects.

The present inventors have found that the 4-acetoxyalkyl - benzylidenemalonitriles represented by the above-mentioned formula show excellent actions to exterminate various pathogenic fungi and microbes and have activities of a wide scope such as insecticidal, acaricidal and nematocidal activities.

The novel active compounds of the present invention can effectively inhibit or exterminate such plant diseases as, for example, rice blast and have, in addition, strong fungicidal effects on Helminthosporium leaf spots (*Cochliobolus miyabeanus* Drechsler) and the like. Further, they not only show excellent insecticidal actions to exterminate, for example, plant hoppers and northern house mosquito larvae but also have effects on spider mites, and are excellent in nematocidal actions or, for example, root-knot nematodes of tomatoes.

The novel compounds of the present invention can be easily prepared by reacting 4-hydroxy-alkyl-benzylidenemalontriles represented by the formula,

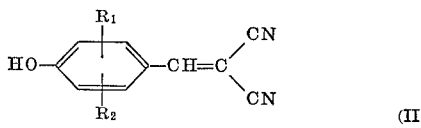

(II)

wherein $R_1$ and $R_2$ have the same significances as mentioned above, with an acetylating agent such as an acetyl halide or acetic anhydride.

That is, for example, in an inert solvent, such as benzene, toluene or ether, a 4-hydroxy-alkyl-benzylidenemalonitrile represented by the Formula II and acetyl chloride are mixed, stirred and refluxed for several hours in the presence of magnesium powder or an organic base, such as pyridine or dimethylaniline, which may react with hydrogen chloride.

The acylation may be carried out in another method. For example, a mixture of a 4-hydroxy-alkyl-benzylidenemalonitrile, acetic anhydride and an inert solvent, for example, benzene, toluene or ether, is refluxed for several hours. The acylation is catalyzed by sulfuric acid, p-toluenesulfonic acid, zinc chloride or sodium chloride.

After the reaction is over, the product is isolated by a conventional method, and if necessary it is purified by recrystallization from petroleum ether or benezene-n-hexane.

Examples of the thus obtained compounds suitable for the object of the present invention are as shown below, but the present invention is, of course, not limited only to these.

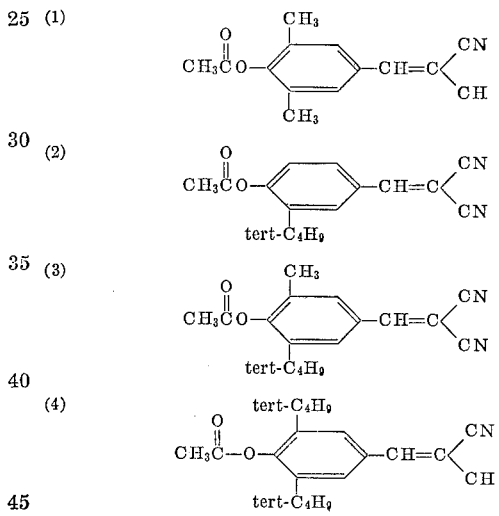

The present compounds differ one another in physiological activities depending on the number and positions of substituted alkyl groups in the benzene nuclei. For example, as to the preventive and exterminative effects on rice blast, a compound having two alkyl substituents is superior to a compound having one alkyl substituent. Further, in the case of disubstituted compounds also, 3,5-dialkyl-4-acetoxy-benzylidenemalonitriles are more excellent, and there is observed such a tendency that particularly prominent effects are observed when alkyl groups relatively large in number of carbon atoms have been introduced into said 3- and 5-positions. For example, 3,5-di-tert.-butyl-4-acetoxy-benzylidenemalontrile is excellent in fungicidal effect and has substantially complete preventive and exterminative effects on rice blast, which is a disease bringing about the greatest damage in the rice crops of Japan.

The present compounds are most desirably used as plant disease-preventing and exterminating chemicals. However, they have physiological activities of a wide scope such as insecticidal, acaricidal, nematocidal and algaecidal activities, and hence are recommended to be used as chemicals for exterminating other injurious living things, such as insecticides, acaricides, nematocides, algaecide and the like, whereby the desired effects can sufficiently be attained in said fields, as well.

Organo-mercury preparations, which are used in markedly large quantities for the control of diseases of rice crops at present, are high in toxicity to mammals, and therefore the application thereof as agricultural chemicals has come into serious problem.

The compounds of the present invention, however, contain no such poisonous heavy metal as mercury and hence have a great advantage in handling. Further, labor-saving is strongly desired at present from the standpoint of agricultural administration and therefore the chemicals usable for multi-purposes, like the present compounds, is advantageous. In addition, the present compounds may be used in admixture with other chemicals to make the effects thereof more accurate. That is, it is not objectionable at all to use the present compounds in admixture with antibiotics such as Blasticidin-S and Kasugamycin; organophosphorus fungicides such as O,O-diethyl-S-benzyl-phosphorodithiolate and O-ethyl - S,S' - diphenyl - phosphorodithiolate; organochlorine fungicides such as pentachlorobenzyl alcohol and pentachlorobenzaldoxime; organo-sulfur fungicides; or organo-arsenic fungacidies. Further, for the purpose of simultaneous control of two or more kinds of disease or injurious insects, the present compounds may be used in admixture with insecticides such as BHC, Parathion, Malathion, Sumithion, Dimethoate, Diazinon, naphthyl-N-methylcarbamate, 3,4-dimethyl - phenyl-N-methylcarbamate and the like, or with the aforesaid fungicides in addition thereto. Alternatively, they may be used in admixture with herbicides such as 2,4-D, MCP, 3,4-dichloropropionic acid anilide, and 2,4-dichlorophenyl-4'-nitrophenyl ether; other agricultural chemicals such as nematocides or acaricides; or fertilizers, whereby synergistic effects due to mixing can be expected depending on combinations.

The preparation of the novel compounds in accordance with the present invention will be illustrated in detail below with reference to examples. But it is not intended to limit the invention.

EXAMPLE 1

5.2 g. 3,5 - di-tertiary-butyl-4 - hydroxybenzylidenemalonitrile and 7.9 g. of pyridine were dissolved in 100 ml. of benzene. To the solution, 2.0 g. of acetic acid chlorine was added dropwise, with stirring, and the mixture was refluxed for 10 hours. After allowing to cool, the mixture was washed successively with dilute hydrochloric acid, aqueous dilute caustic soda solution and water, and benzene was removed according to reduced pressure distillation to obtain 5.1 g. of desired 4 - acetoxy-3.5 - ditertiary-butyl benzylidenemalonitrile, M.P. 104°–106° C.

*Elementary analysis.*—Found (percent): C, 74.26; H, 7.54; N, 8.79. Calculated (percent): C, 74.04; H, 7.46; N, 8.69.

EXAMPLE 2

5.2 g. of 3,5 - di-tertiary-butyl - 4 - oxybenzylidenemalonitrile was added to 20 g. of acetic anhydride, and the mixture was refluxed for 10 hours. After completion of the reaction, acetic acid and excess acetic anhydride were removed according to reduced pressure distillation, and the residue was dissolved in 200 ml. of petroleum ether. The solution was washed successively with dilute hydrochloric acid, aqueous dilute caustic soda solution and water, and then petroleum ether was removed according to reduced pressure distillation to obtain 4.9 g. of desired 4-acetoxy-3,5-di-tertiary-butyl-benzylidenemalonitrile, M.P. 104°–106° C.

*Elementary analysis.*—Found (percent): C, 73.98; H, 7.47; N, 8.77. Calculated (percent): C, 74.04; H, 7.46; N, 8.69.

In practice, the present compounds may be used in admixture with other active ingredients, as mentioned before, or may be used in pure form without addition of other ingredients. Further, for easier use as preventive or exterminative chemicals, they may be used in combination with carriers and can be formulated into compositions of any of the ordinarily adopted forms such as dusts, wettable powders, emulsifiable concentrates, granules, oil preparations or aerosols.

The preparation of compositions containing the present compounds will be illustrated in further detail below with reference to examples, but it is needless to say that the kinds and mixing proportions of compounds and additives are not limited only to these but are variable within wide ranges. In the examples, all the parts and percentages are by weight unless otherwise specified, and the names of compounds are presented by the numbers of the previously exemplified compounds.

EXAMPLE 3

50 parts of Compound 4, 5 parts of a wetting agent (of the alkyl benzenesulfonate type) and 45 parts of diatomoceous earth are thoroughly pulverized and mixed together to obtain a wettable powder containing 50% of an active ingredient. In application, the wettable powder is diluted with water and is sprayed.

EXAMPLE 4

25 parts of Compound 2, 4 parts of a wetting agent (of the higher alcohol sulfonate type), 1 part of polyvinyl alcohol, and 70 parts of clay are thoroughly pulverized and mixed together to obtain a wettable powder containing 25% of active ingredient. In application, the wettable powder is diluted with water and is sprayed.

EXAMPLE 5

2 parts of Compound 3 and 98 parts of clay are thoroughly pulverized and mixed together to obtain a dust containing 2% of active ingredient. In application, the dust may be dusted as such or may be applied in admixture with soil.

EXAMPLE 6

3 parts of Compound 1 and 97 parts of a talc-clay mixture are thoroughly pulverized and mixed together to obtain a dust containing 3% of active ingredient. In application, the dust may be dusted as such or may be applied in admixture with soil.

In order to substantiate the excellent effects of the novel active compounds of the present invention, typical test results will be shown below with reference to test examples, in which the names of compounds are represented by the numbers of the previously exemplified compounds.

Test Example 1, rice blast prevention and extermination test

To rice plants (variety: Waseasahi), which had been individually cultivated to the 3 leaves-stage in a flower pot of 9 cm. in diameter, solutions of test chemicals at a given concentration were individually sprayed in an amount of 7 ml. per pot. After 2 hours, a spore-suspension of rice blast fungi (*Pyricularia oryzae*) was sprayed and inoculated. After incubation of 4 days, the number of spots generated was counted to investigate fungicidal effects, whereby the results as shown in Table 1 were obtained. The control value in the table was calculated according to the equation.

Control value $$= \frac{\text{Number of spots of non-treated area} - \text{Number of spots of treated area}}{\text{Number of spots of non-treated area}} \times 100$$

TABLE 1

| Compound | Active ingredient concentration (p.p.m.) | Control value |
|---|---|---|
| (1) | 500 | 92.3 |
| (2) | 500 | 88.7 |
| (3) | 500 | 95.6 |
| (4) | 500 | 100.0 |
| Non-treatment | | 0 |

Test Example 2

Three mottled kidney bean plants were grown to the two leaves-stage a flower pot of 9 cm. in diameter. To the plants, a large number of two spotted spider mite were parasitized. Subsequently, a 0.1% solution of the 50% wettable powder of Example 3 was sprayed in an amount of 10 ml. per pot. After 48 hours, the alive and dead of the mites were observed by means of magnifying-glass to obtain a mortality value of 95%.

Test Example 3

Solutions prepared by diluting with water to a given concentration the 50% wettable powder of Example 1 were charged respectively into a 500 ml. beaker. Into the beaker, 50 full grown larvae of northern house mosquitoes were liberated. After 24 hours, the alive and dead of the mosquito larvae were observed to obtain a mortality value of 100% at an active ingredient concentration of 1 p.p.m.

What is claimed is:

1. A-acetoxy-benzylidenemalonitriles represented by the formula,

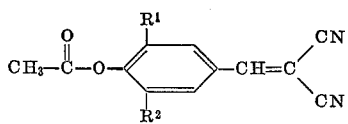

wherein $R^1$ and $R^2$ are hydrogen or lower alkyl, with the proviso that at least one is lower alkyl.

2. 3,5 - dimethyl - 4 - acetoxy - benzylidenemalonitrile represented by the formula,

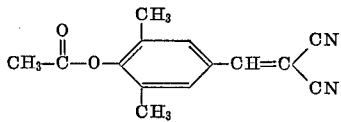

3. 3 - tert. - butyl - 4 - acetoxy - benzylidenemalonitrile represented by the formula,

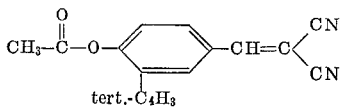

4. 3 - methyl - 5 - tert. - butyl - 4 - acetoxy - benzylidenemalonitrile represented by the formula,

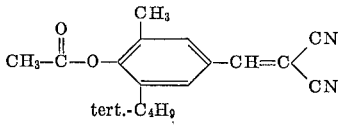

5. 3,5 - di - tert. - butyl - 4 - acetoxy - benzylidenemalonitrile represented by the formula,

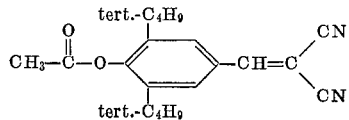

References Cited

UNITED STATES PATENTS

| | | |
|---|---|---|
| 3,183,250 | 5/1965 | Rosenblatt et al. __ 260—465 X |
| 3,244,668 | 4/1966 | Knapp et al. |
| 3,278,448 | 10/1966 | Laurer et al. |
| 3,313,829 | 4/1967 | Rosenblatt et al. __ 260—465 X |

OTHER REFERENCES

Wagner et al., Synthetic Organic Chemistry, pp. 481–483 (1964).

CHARLES B. PARKER, Primary Examiner

D. H. TORRENCE, Assistant Examiner

U.S. Cl. X.R.

260—431, 440, 482, 562, 566, 612, 618, 963, 965; 424—251, 278, 304